June 27, 1967 F. N. TAYLOR 3,328,602

ELECTRICAL PULSE WIDTH DISCRIMINATORS

Filed June 22, 1964

Inventor
FRANK N. TAYLOR
By
Holcombe, Wetherill & Brisebois
Attorneys

United States Patent Office 3,328,602
Patented June 27, 1967

3,328,602
ELECTRICAL PULSE WIDTH DISCRIMINATORS

Frank Newland Taylor, Leicester, England, assignor to Rank Precision Industries Limited, trading as The Rank Organisation Rank Taylor Hobson Division, Leicester, England, a British company Filed June 22, 1964, Ser. No. 376,919
Claims priority, application Great Britain, June 25, 1963, 25,224/63
9 Claims. (Cl. 307—88.5)

Figure 1:
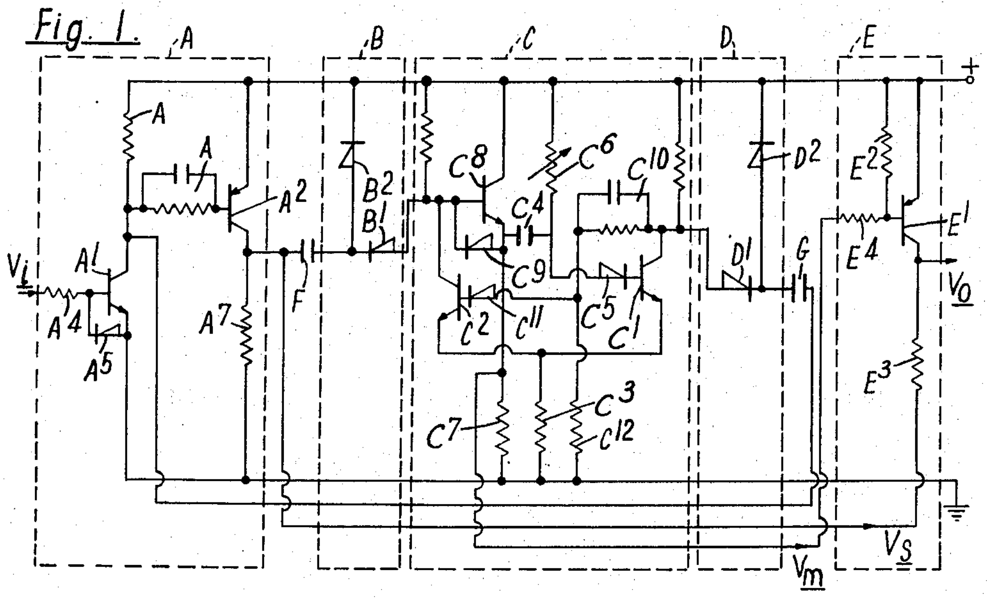
Figures 2A, 2B, 2C, 2D:
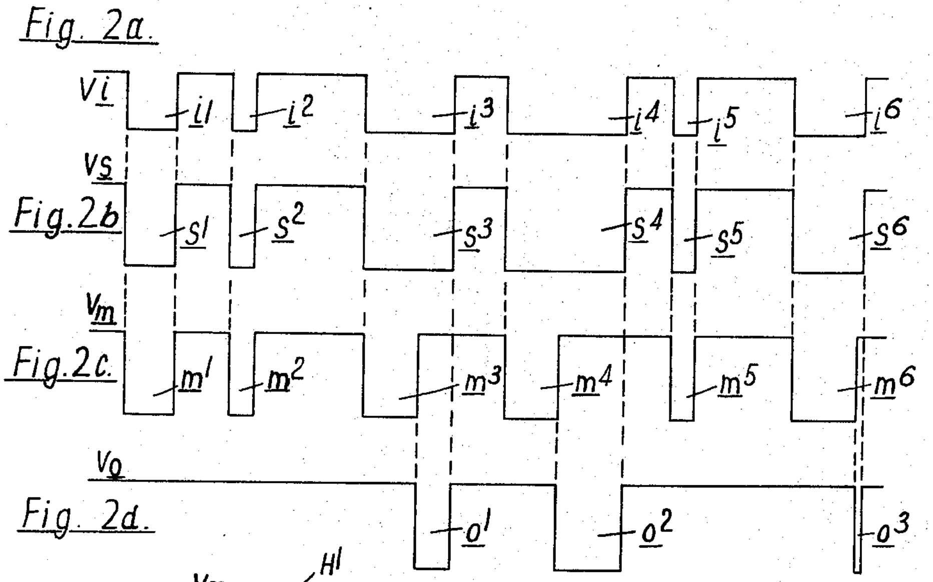

This invention relates to an electrical pulse width discriminator and has for its object to provide means whereby pulses of a duration longer than a predetermined time period can be distinguished from pulses of a duration not longer than such time period.

Such discrimination may be required for example in sorting where electrical pulses are generated of durations corresponding to the varying sizes of articles passing a control point of a constant velocity conveyor or in general for sorting pulses according to their width in an oscillatory signal.

The electrical pulse width discriminator according to the invention comprises a switching circuit which in response to an output pulse provides at two output points two pulses of opposite polarity each of width equal to that of the input pulse, a monostable circuit having an unstable condition into which such circuit can be triggered and incorporating a time delay whereby the unstable condition is maintained for a predetermined period after triggering before the circuit naturally reverts to its stable condition, thereby to provide at an output point of such circuit a pulse of predetermined width, an output gate circuit having two input points so as to be responsive to two input signals of predetermined polarities and providing an output pulse when the level of one input signal remains unchanged longer than the other, a connection whereby the gate circuit is fed with the pulse of predetermined width from the monostable circuit and an output pulse from the switching circuit, a gating circuit whereby the monostable circuit is triggered into its unstable condition by the leading edge of the output pulse of one polarity from the switching circuit, and a second gating circuit whereby the trailing edge of the output pulse of opposite polarity from the switching circuit acts to cause the monostable circuit to revert prematurely to its stable condition when the duration of such output pulse is shorter than the time delay of such monostable circuit, whereby the output gate circuit provides an output pulse only when the input pulse to the switching circuit is of duration exceeding the time delay of the monostable circuit.

For discriminating in respect of width between varying waveforms, such waveforms may conveniently be first fed to a trigger circuit providing pulses of substantially square waveform for feeding to the switching circuit.

The time delay of the monostable circuit is preferably adjustable. For example, such time delay may be provided by a capacitance and a variable resistor.

In a convenient arrangement, the leading edge of the output pulse of the switching circuit fed to the output gate circuit is used to trigger the monostable circuit.

The switching circuit may conveniently comprise a transistor to the base of which is applied the input pulse and having its collector in circuit with the base of a second transistor, the two output points being in circuit respectively, with the collectors of the two transistors. Thus, in one convenient arrangement, one output point of the switching circuit is at the collector of the first transistor, and the second output point is at the emitter of an emitter-follower third transistor the base of which is connected to the collector of the second transistor.

The monostable circuit may conveniently comprise a first transistor having the time delay in circuit with its base, and a second transistor having its emitter in circuit with the emitter of the first transistor, triggering of the monostable circuit being effected at the base of the first transistor to cause such transistor to change its state thereby to cause the second transistor to change its state, and the output point of the monostable circuit being in circuit with the collector of one of the two transistors. With this arrangement, it will be appreciated that the second transistor reverts to its original state when the first transistor reverts to its original state. In a convenient arrangement, the output point of the monostable circuit is at the emitter of an emitter-follower third transistor the base of which is connected to the collector of the first or second transistors.

The output gate circuit may conveniently comprise a pair of diodes respectively fed with the two input signals, such signals being of the same polarity, and a cathode load common to the two diodes across which the output of the gate circuit is developed. An alternative output gate circuit comprises a transistor to the base and collector of which are respectively fed the two output signals, such input signals being of opposite polarity, and a load in the collector circuit across which the output of the gate circuit is developed. Either of these output gate circuits provides an output pulse of width corresponding to the excess duration of the input pulse to the switching circuit over the time delay of the monostable circuit. However, when discrimination is being effected only for counting purposes, this may not be important. For the last mentioned purposes, the output of the gate circuit may conveniently be fed to a pulse-counting circuit.

Figure 3:
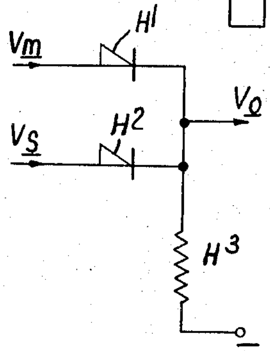

The invention may be carried into practice in various ways but a convenient practical arrangement of electrical pulse width discriminator according thereto will now be described by way of example with reference to the accompanying drawings, in which FIGURE 1 is a circuit diagram of the arrangement, FIGURES 2*a*, 2*b*, 2*c* and 2*d* are waveform diagrams associated with the arrangement, and FIGURE 3 shows a modified output gate for the arrangement.

The purpose of the arrangement is to consider a series of pulses and discriminate between those pulses whose widths exceed a predetermined value and those pulses whose widths do not exceed such predetermined value. For discriminating in respect of width between varying waveforms contained in an input signal, such waveforms are first fed to a trigger circuit for example a Schmitt trigger circuit, which produces a series of pulses of square waveform whose widths proportionately correspond to the widths of the varying waveforms at a predetermined level of the input signal. When the provision of such a trigger circuit is unnecessary, the first circuit of the discriminator consists of a transistor switching circuit A. It will be assumed that the input signal to this switching circuit A consists of a series of varying width pulses of substantially square waveform and negative polarity.

The transistor switching circuit A comprises two transistors $A^1$ and $A^2$ the first of which has its emitter connected to ground and its collector connected through a load resistance $A^3$ to positive high voltage. The input signal is applied through an input resistance $A^4$ to the base of the first transistor $A^1$, such transistor base being connected to ground through a semi-conductor diode $A^5$. The output of the first transistor $A^1$ is applied to the base of the second transistor $A^2$ through a coupling $A^6$ consisting of a resistance and capacitance in parallel, the emitter of such second transistor being connected to positive high voltage and the collector of such second transistor being connected though a resistance $A^7$ to ground. Before the arrival of a negative pulse, the first transistor $A^1$ is conducing and the second transistor $A^2$ is substantially nonconducing. These conditions are reversed during the period of a negative input pulse.

The above described switching circuit has two output points, one at the collector of the first transistor $A^1$ and the other at the collector of the second transistor $A^2$. A negative input pulse gives rise to a positive output pulse of unchanged duration at the first output point and a negative output pulse of unchanged duration at the second output point. The second output may be taken through an emitter follower (not shown) if desired.

The negative output pulse of the switching circuit is fed directly to the first of two input points of a gate circuit E of the kind commonly known as an "and" gate. Such "and" gate E comprises a transistor $E^1$ whose emitter is connected to positive high voltage and whose base is biassed relative to positive high voltage by means of a resistance $E^2$. The negative output pulse of the switching circuit A is applied through a resistance $E^3$ to the collector of the transistor $E^1$, which constitutes the output point of the "and" gate, and to the base of the transistor $E^1$ through a resistance $E^4$ is applied a negative pulse of predetermined duration obtained from a monostable circuit C.

The monostable circuit C comprises two transistors $C^1$ and $C^2$ the collectors of which are each connected to positive high voltage through a resistance and the emitters of which are connected together and through a load resistance $C^3$ to ground. The collector of the transistor $C^1$ has an electrical connection to the base of the transistor $C^2$ and the collector of the transistor $C^2$ has a connection to the base of the transistor $C^1$. With this arrangement, a change in state of the first transistor $C^1$, which is normally conducting, causes a change in state of the second transistor $C^2$, which is normally substantially non-conducting. The negative output pulse of the switching circuit A, in addition to being fed to the "and" gate E, is used to trigger the monostable circuit C to cause the first transistor $C^1$ to change its state. For this purpose, such negative pulse is applied through a coupling capacitor F, an input gate B, a capacitor $C^4$ associated with a time delay, and a semi-conductor diode $C^5$ to the base of such transistor $C^1$. The input gate consists of a shunt connection to positive high voltage through a semi-conductor diode $B^2$ of appropriate polarity and a semi-conductor diode $B^1$ of the opposite polarity in series with the coupling capacitance F. The timing capacitor $C^4$ has a shunt connection to positive high voltage through a variable resistance $C^6$. Such capacitance $C^4$ and variable resistance $C^6$ provide a time delay, whereby, when the monostable circuit C is triggered to cause a change of state of the first transistor $C^1$ and thence the second transistor $C^2$ such first and thence such second transistors return to their original state after a predetermined time period determined by the setting of the variable resistance $C^6$. The monostable circuit is triggered by the leading edge of the negative pulse applied to the base of the first transistor $C^1$ and thereby gives rise to the leading edge of a negative output pulse at an output point constituted by the emitter, having a load $C^7$, of an emitter follower $C^8$ connected between the collector of the second transistor $C^2$ and timing capacitor $C^4$, a shunt in the form of a semi-conducting diode $C^9$ providing the path for the input pulse. The presence of this emitter follower $C^8$ reduces the reset time of the monostable circuit C on natural reversion thereof to its original state. After the predetermined time delay, the two transistors $C^1$ and $C^2$ naturally revert to their original state, thereby giving rise to the trailing edge of the positive output pulse at the emitter of the emitter follower $C^8$.

With the arrangement of monostable circuit above described the trailing edge of the negative output pulse of the switching circuit A does not cause such monostable circuit C to revert prematurely to its original state if the duration of such switching circuit output pulse is less than the predetermined time delay, nor is it possible satisfactorily to utilise the leading and trailing edges of a single pulse to trigger the monostable circuit C in opposite directions. Instead, in the event of the switching circuit pulse duration being less than the predetermined time delay, the trailing edge of the positive output pulse from the switching circuit is utilised. Thus, the first output point of the switching circuit A is connected through a second coupling capacitor G second input gate D, comprising the two diodes $D^1$ and $D^2$ as with the first of such input gates, a capacitance resistance coupling $C^{10}$ and a further diode $C^{11}$, to the base of the second transistor $C^2$ of the monostable circuit C. A resistance $C^{12}$ is provided between the coupling $C^{10}$ and ground. The provision of means for prematurely causing the monostable circuit C to revert to its original condition when the pulse from the switching circuit A is of width less than the predetermined pulse width of such monostable circuit ensures that such circuit is prepared for the second of two closely following pulses from the switching circuit.

At the "and" gate E, the transistor $E^1$ is cut off, to develop a negative output pulse across the collector load $E^3$, only when the duration of the negative output pulse from the switching circuit A exceeds the duration of the negative pulse from the monostable circuit C. The duration of the latter pulse is determined by the setting of the variable resistance $C^6$, except when the monostable circuit C is caused to revert prematurely to its original state due to the input pulse from the switching circuit A being of duration less than the time delay of such monostable circuit.

FIGURES 2*a*, 2*b*, 2*c* and 2*d* respectively show, in corresponding phase relationship, a typical pulse input $V_i$ to the switching circuit A, the resulting pulse output $V_s$ of the switching circuit fed to one input point of the "and" gate E, the resulting pulse output $V_m$ of the monostable circuit fed to the other input point of the "and" gate E, and the pulse output $V_o$ from the "and" gate. It will be seen that the six input pulses $i^1, i^2 \ldots i^6$ give rise to six corresponding pulses $s^1, s^2 \ldots s^6$ from the switching circuit, of which only three ($s^3$, $s^4$ and $s^6$) are longer than the time delay of the monostable circuit, which produces the six output pulses $m^1, m^2 \ldots m^6$. The output of the "and" gate thus consists only of three pulses $o^1$, $o^2$ and $o^3$.

FIGURE 3 shows an alternative "and" gate which may be employed, being fed at one input point with the same pulse output $V_s$ of the switching circuit A but at the second input point being fed with the monostable pulse output $V_m$ in the form of positive pulses taken from the collector of the first transistor $C^1$.

Initially, before arrival of a pulse from the switching circuit, the first diode $H^2$ of the gate, whose anode is connected to the output point of the switching circuit, is conducting and the second diode $H^1$, whose anode is connected to the output point of the monostable circuit, is substantially nonconducting. With the arrival of the leading edge of the negative pulse from the switching circuit at its anode the first diode $H^2$ is rendered substantially non-conducting, but simultaneously, due to triggering of the monostable circuit, the leading edge of a positive pulse arrives at the anode of the second diode $H^1$, rendering such diode conducting. Since the diodes have a common cathode load $H^3$, there is no change in potential $V_o$ at the output point. However, after the predetermined time delay, the trailing edge of the positive pulse from the monostable circuit arrives at the second diode $H^1$, thereby rendering such diode substantially non-conducting again. If at this time the negative pulse at the first diode has not ended, both diodes $H^1$ and $H^2$ are simultaneously substantially non-conducting and the potential $V_o$ at the output point falls, giving rise to the leading edge of a negative pulse. The potential at the output point rises again to give rise to the trailing edge of the negative pulse at the end of the pulse from the switching circuit, since the first diode $H^2$ is then rendered conducting again. Thus, the output from the "and" gate consists of a negative pulse of duration equal to the excess duration of the output pulse from the switching circuit, which is also the excess duration of the input pulse to such switching circuit, over the time delay of the monostable circuit as determined by the setting of the variable resistance. Thus, of a series of negative pulses of varying width fed into the switching circuit, the "and" gate gives rise to output pulses only for those input pulses exceeding a predetermined width. It is to be noted that since for an input pulse shorter than such predetermined width, the pulse from the monostable circuit ends simultaneously with the end of such shorter input pulse, causing a simultaneous reversal of the state of the diodes $H^1$ and $H^2$ of the "and" gate, no change results in the potential at the output point.

The arrangements of pulse width discriminator above-described have a variety of applications. Thus, as one example, it may be mentioned that when the input pulses are generated in accordance with the passage of articles of varying size at the control point of a constant velocity conveyor, the output of the "and" gate indicates the number and size of articles, larger than a predetermined size, passing the conveyor control point. For counting such articles of excess size, the output of the "and" gate is fed through an inverter to a pulse-counting circuit.

Various modifications to the above described arrangement are possible within the scope of the invention.

What I claim as my invention and desire to secure by Letters Patent is:

1. An electrical pulse width discriminator, comprising a switching circuit, means for feeding an input pulse to the switching circuit, means within the switching circuit controlled by the said input pulse for providing respectively at two output points first and second output pulses of opposite polarity each of width equal to that of the input pulse, a monostable circuit having an unstable condition into which the circuit can be triggered and incorporating time delay means whereby the unstable condition is maintained for a predetermined period before the circuit naturally reverts to its stable condition thereby providing at an output point of the circuit a pulse of predetermined width, two gating circuits through which the two output pulses from the switching circuit are respectively fed to different points of the monostable circuit, means whereby the triggering of the monostable circuit is effected by the first of such output pulses in synchronism with the leading edge thereof, means whereby when the duration of each of such output pulses is shorter than the time delay of the monostable circuit such circuit is caused by the second of such output pulses to revert prematurely to its stable condition in synchronism with the trailing edge of such second output pulse, an output gate circuit of the kind which when fed at two input points respectively with a first input signal and with a second input signal provides an output signal only when the duration of the first input signal exceeds that of the second input signal, connecting means for feeding one of the two output pulses from the switching circuit to the output gate circuit to constitute the first input signal thereto, and connecting means for feeding the output pulse of predetermined width from the monostable circuit to the output gate circuit to constitute the second input signal thereto.

2. An electrical pulse width discriminator as claimed in claim 1 in which the time delay of the monostable circuit is adjustable.

3. An electrical pulse width discriminator as claimed in claim 1 in which the leading edge of the output pulse of the switching circuit fed to the output gate circuit is used to trigger the monostable circuit.

4. An electrical pulse width discriminator as claimed in claim 1 in which the output gate circuit comprises a pair of diodes respectively fed with the two input signals, such input signals being of the same polarity, and a cathode load common to the two diodes across which the output of the gate circuit is developed.

5. An electrical pulse width discriminator as claimed in claim 1 in which the output gate circuit comprises a transistor to the base and collector of which are respectively fed the two input signals, such input signals being of opposite polarity, and a load in the collector circuit across which the output of the gate circuit is developed, such output having a pulse width corresponding to the excess duration of the input pulse to the switching circuit over the time delay of the monostable circuit.

6. An electrical pulse width discriminator as claimed in claim 1 in which the switching circuit comprises a transistor to the base of which is applied the input pulse and having its collector in circuit with the base of a second transistor, the two output points being in circuit respectively with the collectors of the two transistors.

7. An electrical pulse width discriminator as claimed in claim 1, in which the monostable circuit comprises a first transistor having the time delay means in circuit with its base, and a second transistor having its emitter in circuit with the emitter of the first transistor, the output point of the monostable circuit being in circuit with the collector of one of the two transistors, triggering of the monostable circuit being effected at the base of the first transistor to cause such transistor to change its state and thereby also to cause the second transistor to change its state.

8. An electrical pulse width discriminator as claimed in claim 7, in which the premature reversion of the two transistors to their stable states, when the pulse width of the input pulse to the switching circuit is less than the predetermined width of the output pulse of the monostable circuit, is effected at the base of the second transistor of the monostable circuit.

9. An electrical pulse width discriminator as claimed in claim 7 in which the output point of the monostable circuit is at the emitter of an emitter-follower third transistor the base of which is connected to the collector of one of the first two transistors.

References Cited

UNITED STATES PATENTS

| | | | |
|---|---|---|---|
| 2,947,945 | 8/1960 | Relis et al. | 320—112 |
| 2,986,649 | 5/1961 | Wray | 307—88.5 |
| 3,122,647 | 2/1964 | Huey | 328—112 XR |
| 3,171 041 | 2/1965 | Haase | 307—88.5 |
| 3,184,606 | 5/1965 | Ovenden et al. | 307—88.5 |

ARTHUR GAUSS, *Primary Examiner.*

I. C. EDELL, R. H. EPSTEIN, *Assistant Examiners.*